US006644575B1

(12) United States Patent
Farrell

(10) Patent No.: US 6,644,575 B1
(45) Date of Patent: Nov. 11, 2003

(54) GRAVITY FLOW GRAIN TANK FOR HAY BALE PROCESSOR

(76) Inventor: Mark Farrell, 75184 Hwy. 21, Eustis, NE (US) 69028

( * ) Notice: Subject to any disclaimer, the term of this patent is extended or adjusted under 35 U.S.C. 154(b) by 0 days.

(21) Appl. No.: 10/097,712

(22) Filed: Mar. 13, 2002

(51) Int. Cl.[7] .............................................. B02C 19/12
(52) U.S. Cl. ................................ 241/101.762; 241/605
(58) Field of Search .............................. 241/101.2, 605, 241/101.76, 101.762, 101.763

(56) References Cited

U.S. PATENT DOCUMENTS 4,428,182 A * 1/1984 Allen et al. .................. 56/14.6
6,121,782 A * 9/2000 Adams et al. ............... 324/689

* cited by examiner

Primary Examiner—Mark Rosenbaum

(57) ABSTRACT

A gravity flow grain tank includes enclosed chamber mounted on a hay processor, for holding grain to be dispensed. The chamber includes a rearwardly and downwardly sloped bottom, so that gravity causes the grain to flow into an auger at the lower end of the chamber. The auger extends outwardly from the chamber, to dispense grain on to processed hay.

5 Claims, 5 Drawing Sheets

GRAVITY FLOW GRAIN TANK FOR HAY BALE PROCESSOR

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to hay processing equipment for the shredding of hay bales into windrows, and more particularly to an improved gravity flow grain tank attachment for such a hay processor.

(2) Background Information

Hay bale processing for the feeding of livestock has developed from horse-drawn hay loaders, to modern machines handling large round bales and the like. Various types of hay baling machines are available which form hay into small rectangular bales, large round bales, or various shaped stacks. When it is desired to feed livestock, further processing of the bales or stacks is typically desirable, to make the hay more palatable and nutritious for the livestock.

One method for processing large round bales includes the use of a hay processor, which will shred a large round bale and dispense the processed hay into a row alongside the machine. As the processor is pulled by a tractor, the row of hay may be dropped on to the ground, or into feed bunks, as desired.

Because cattle like grain, it is possible to make old or lower quality hay palatable for cattle by top dressing the hay with corn, cereal grains, or palletized feed supplements. It would be desirable to top dress the processed hay simultaneously with the processing of the hay, as the hay is dropped to the feeding location.

BRIEF SUMMARY OF THE INVENTION

It is therefore a general object of the present invention to provide an improved grain tank for hay processors for dispensing grain on top of processed hay during the processing of the hay.

Another object of the present invention is to provide a hay processor with a gravity flow grain tank attachment which is simple to use.

A further object is to provide a grain tank attachment which has few moving parts, and requires little maintenance or repair.

These and other objects of the present invention will be apparent to those skilled in the art.

The gravity flow grain tank of the present invention an enclosed chamber mounted on a hay processor, for holding grain to be dispensed. The chamber includes a rearwardly and downwardly sloped bottom, so that gravity causes the grain to flow into an auger at the lower end of the chamber. The auger extends outwardly from the chamber, to dispense grain on to processed hay.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
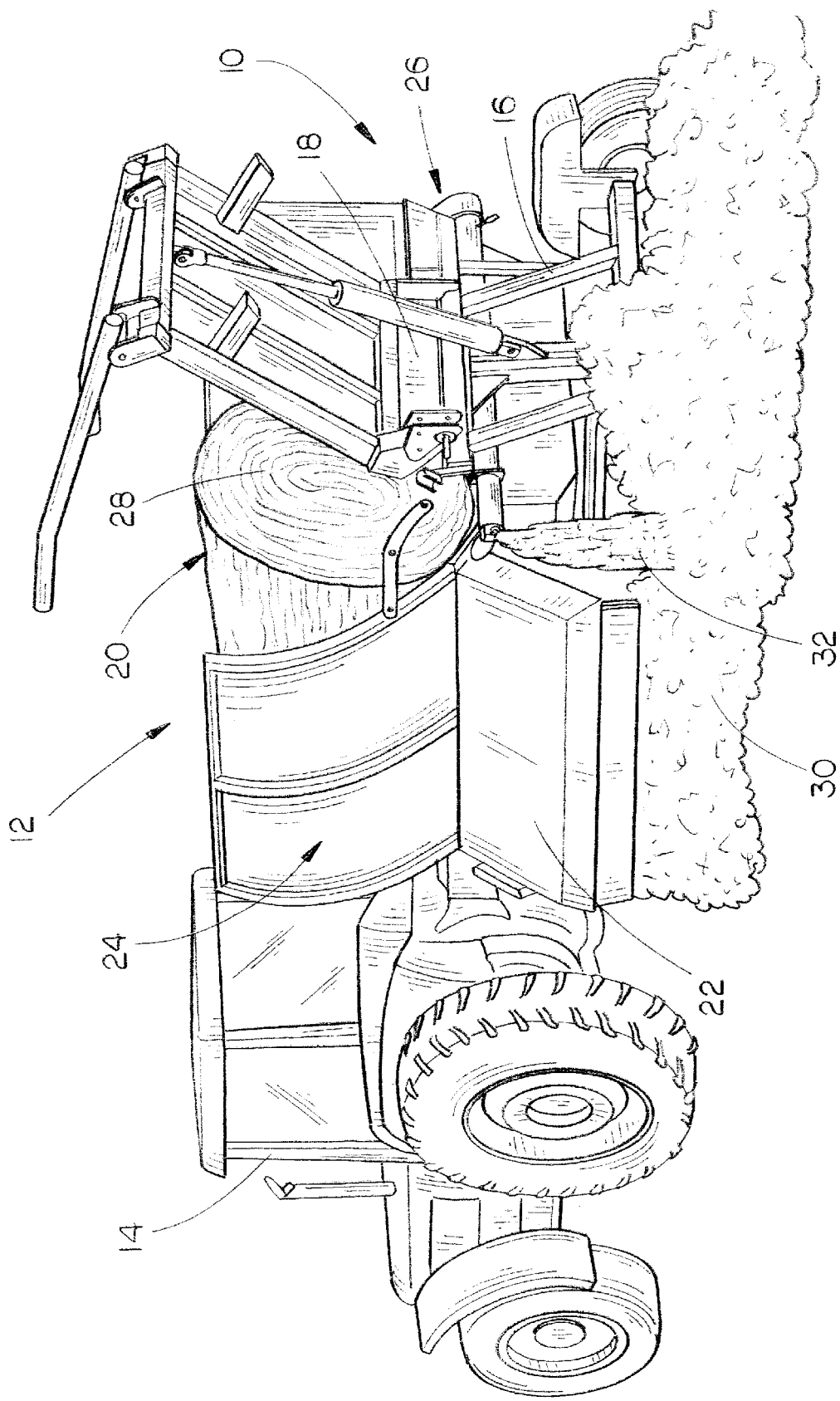
FIG. 1 is a perspective view of a hay processor in use, with the grain tank of the present invention.

Referring now to the drawings, in which similar or corresponding parts are identified with the same reference numeral, and more particularly to FIG. 1, the grain tank of the present invention is designated generally at 10, and is shown mounted on a conventional hay processor 12 towed by a tractor 14.

Hay processor 12 is of the type having a wheeled frame 16 with a rearward end 18, a centrally located shredder chamber 20, a hay distribution deflector 22 on one side 24, and an access side 26 opposite the side 24 with the deflector 22. In FIG. 1, a large round hay bale 28 is shown being shredded and dispensed by deflector 22 into a windrow 30. In addition, grain tank 10 is shown dispensing grain 32 on to the top of the windrow 30 to top dress the hay.

Figure 2:
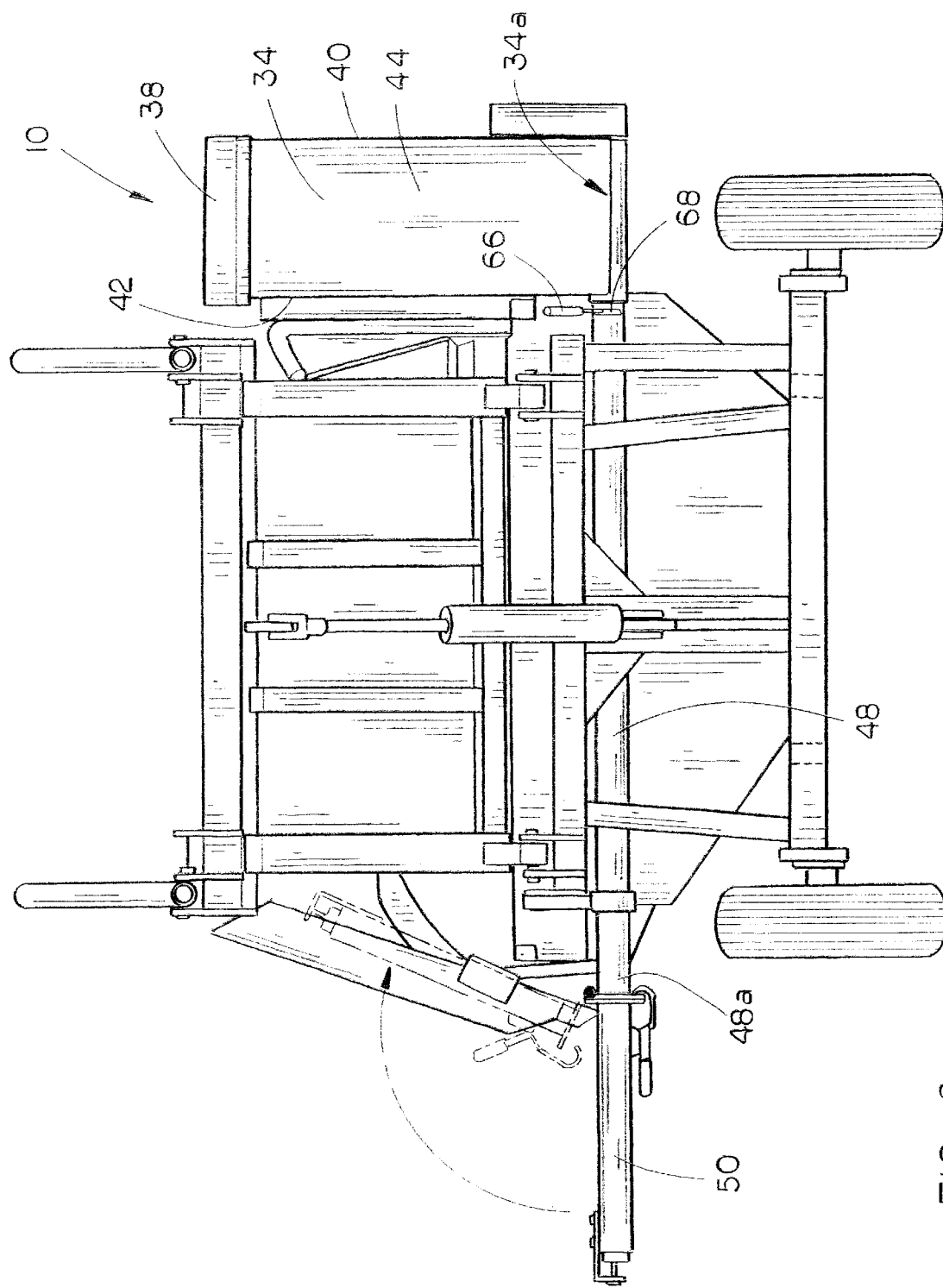
FIG. 2 is a rear elevational view of the hay processor with the grain tank of the invention.
Figure 3:
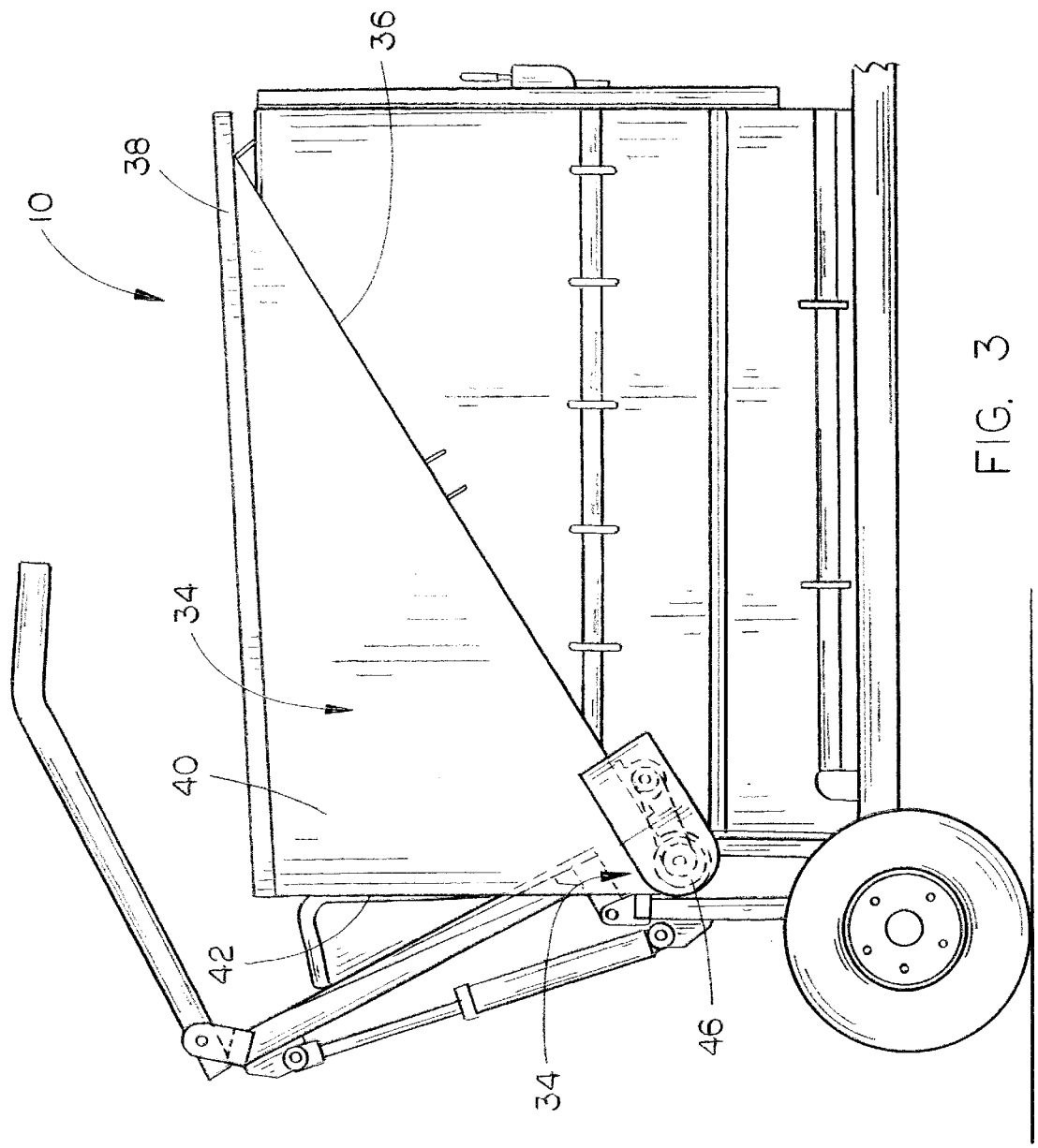
FIG. 3 is a side elevational view of the hay processor with the grain tank of the invention.

Referring now to FIGS. 2 and 3, the grain tank 10 of the present invention includes an enclosed chamber 34 having a sloped bottom 36, an operable lid 38, triangular sidewalls 40 and 42, and rearward wall 44. Lid 38 is hinged, to permit the lid to pivoted to an open position, for filling the chamber 34 with grain or other similar material. As shown in FIG. 3, the chamber bottom 36 is sloped rearwardly at an angle of about 45°. While the angle may be sloped to higher or lower angles, it is important that the slope be sufficient to cause the material within the chamber to slide by gravity to the lower rearward end of the chamber, designated generally at 34a. An auger 46 (shown in broken lines in FIG. 3) has one end positioned within the lower end 34a of chamber 34, to convey material from the chamber, as discussed in more detail below.

Figure 4:
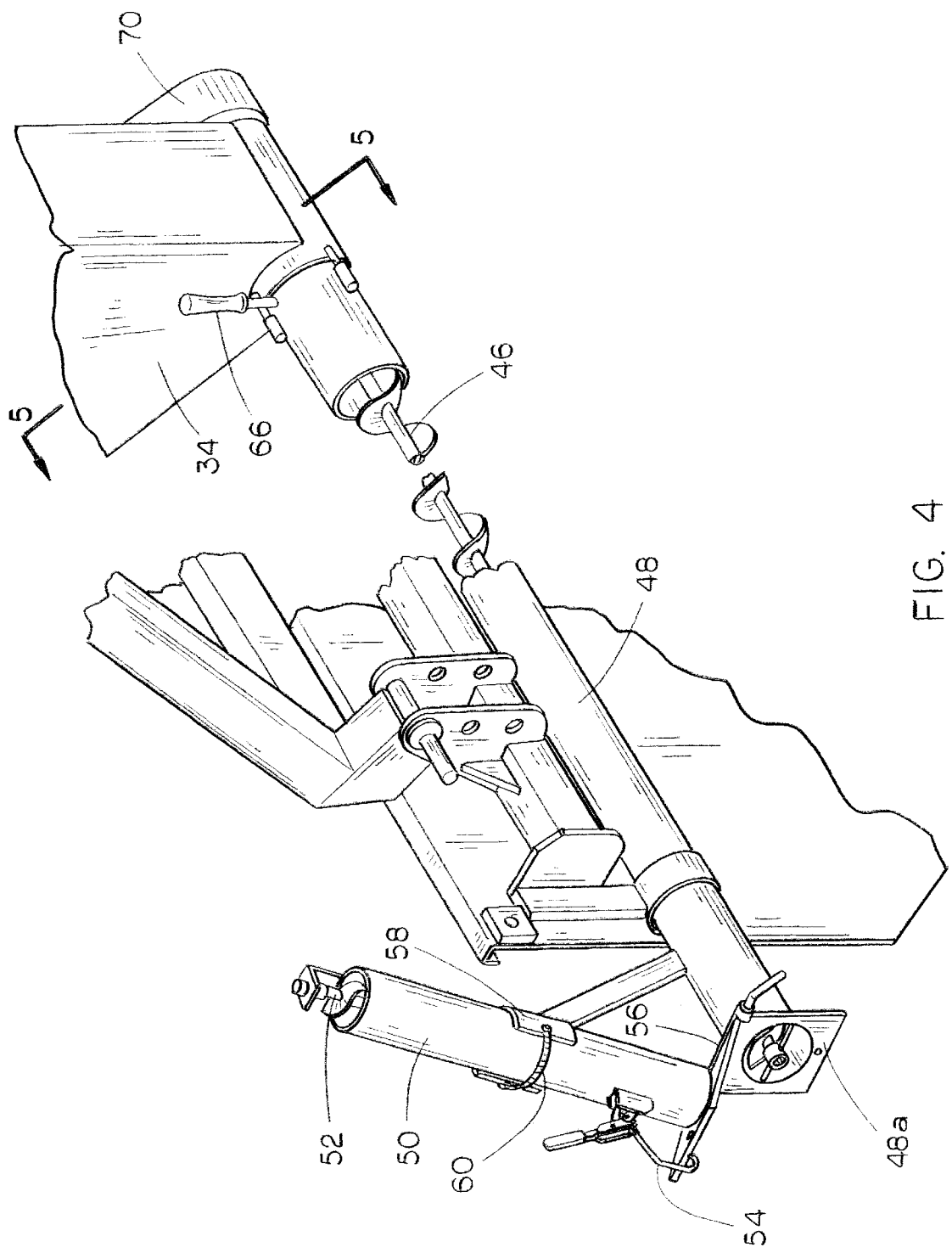
FIG. 4 is an enlarged perspective view of the conveyor auger of the invention, with portions shown broken away to show details of the invention.

Referring now to FIG. 4, auger 46 extends horizontally from chamber 34, across the rearward end 18 of hay processor 12, through tube 48. Tube 48 has a dispensing end 48a projecting outward from the processor 12, and an operable extension tube 50 which may be pivoted into operable engagement with the tube 48, to extend the length of the tube 48, as shown in FIG. 2. Extension tube 50 includes an auger extension 52 therein, which will operably connect to auger 46, when the extension tube 50 is dropped to the operable position, so that auger 46 will rotate auger extension 52 in a conventional fashion.

A clamp 54 secures extension tube 50 in the operable position in engagement with tube 50. Extension tube 50 is connected at one end to a hinge 56, permitting the extension tube 50 to be pivoted to a storage position in a support saddle 58, upwardly and clear of the dispensing end 48a of auger tube 48. A cord 60 secures the extension tube 50 in the storage position.

Figure 5:
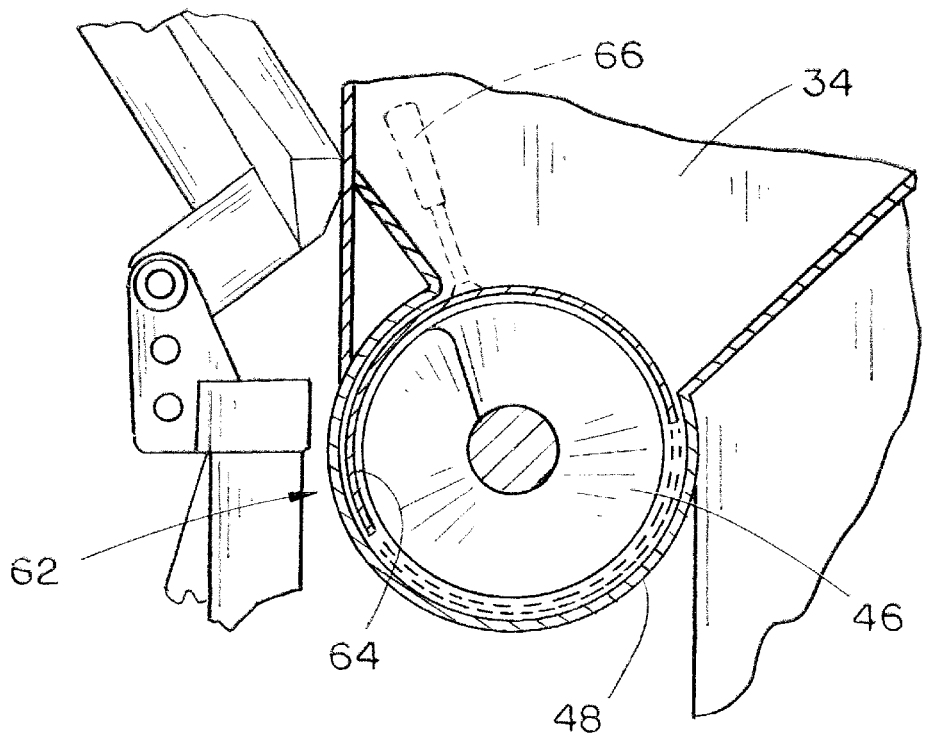
FIG. 5 is a sectional view taken at lines 5—5 in FIG. 4.
Figure 6:
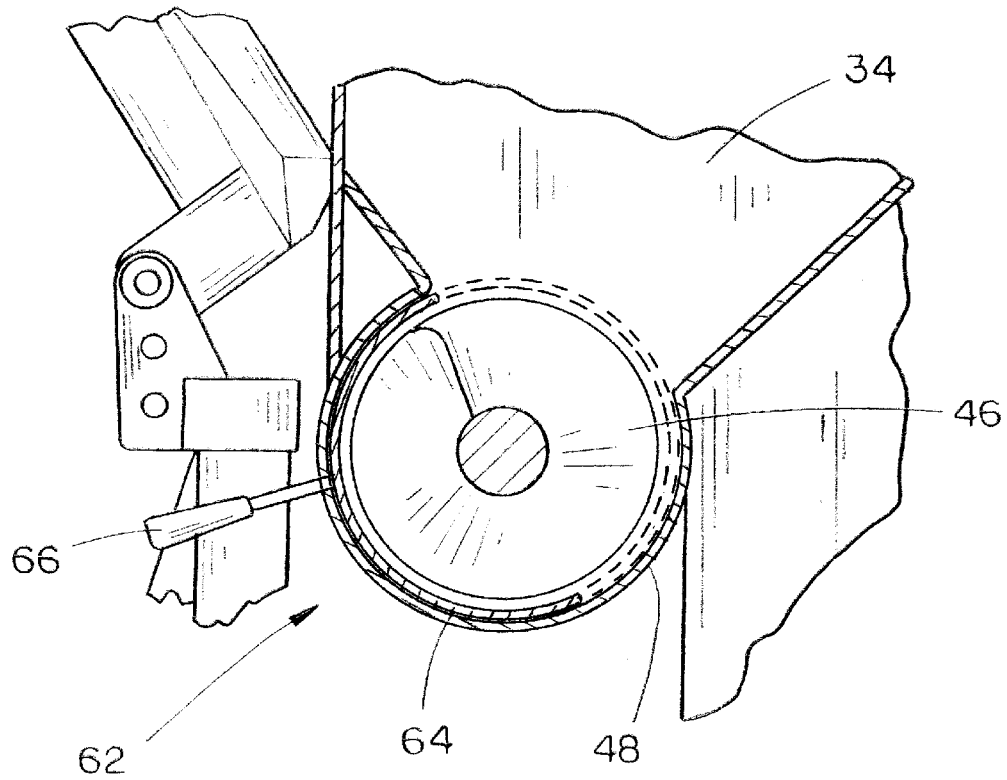
FIG. 6 is a sectional view similar to FIG. 5, but with the auger valve moved to an open position.

FIGS. 5 and 6 show the operation of valve 62, to open and close the passage of grain from chamber 34 to auger 46. Auger tube 48 is open to the interior of chamber 34, to permit grain within chamber 34 to be conveyed by auger 46. Valve 62 includes an elongated arcuate channel 64 curved concentric with auger tube 48 and slidably disposed within auger tube 48. A handle 66 projects from channel 64, through a slot 68 (shown in FIG. 2) in auger tube 48, to permit the slidable rotation of channel 64 within auger tube 48. Because slot 68 is oriented perpendicular to the longitudinal axis of the auger tube 48, channel 64 may only rotate about the longitudinal axis of the auger tube 48 as handle 66 is moved within slot 68.

As shown in FIG. 5, channel 64 may be rotated to close off passage of grain from the chamber 34 to auger 46. FIG. 6 shows handle 66 moved to the open position, wherein grain will pass from the chamber 34 to the auger 46. A motor 70 (shown in FIG. 4) is mounted on the chamber 34 and connected to the auger 46 to selectively drive the auger and dispense grain from the auger tube 48.

Whereas the invention has been shown and described in connection with the preferred embodiment thereof, many modifications, substitutions and additions may be made which are within the intended broad scope of the appended claims.

I claim:

1. In combination:
    a hay processor having a wheeled frame with a rearward end, a hay-dispensing side and an opposing side; and
    a grain tank on the hay processor for dispensing grain on to processed hay, comprising:
        an enclosed chamber mounted on the hay processor for holding grain, the chamber including a rearwardly-sloped bottom;
        an elongated tube having a first open end disposed in a lower end of the chamber, and a second dispensing end projecting over hay processed by the hay processor;
        a conveyor within the tube for conveying grain from the chamber to the tube dispensing end; and
        means connected to the conveyor for selectively driving the conveyor to dispense grain.

2. The combination claim 1, wherein said conveyor is an auger.

3. The combination of claim 1, further comprising a valve in the tube, operable between an open position permitting the flow of grain from the chamber into the tube, and a closed position preventing the flow of grain from the chamber to the tube.

4. The combination of claim 3, wherein said valve includes an elongated, arcuate channel mounted for concentric slidable movement within the tube, and a handle projecting from the channel, for rotating the channel between the open and closed positions of the valve.

5. The combination of claim 1, further comprising an extension tube pivotally mounted at one end for movement between an engaged position cooperating with the tube connected to the chamber to extend the length of the chamber tube, and a storage position pivoted away from the dispensing end of the tube connected to the chamber, and including an extension conveyor within the extension tube, cooperable with the conveyor in the tube connected to the chamber to move granular material through the extension tube.

* * * * *

UNITED STATES PATENT AND TRADEMARK OFFICE
CERTIFICATE OF CORRECTION

PATENT NO.   : 6,644,575 B1
DATED        : November 11, 2003
INVENTOR(S)  : Mark Farrell It is certified that error appears in the above-identified patent and that said Letters Patent is hereby corrected as shown below:

<u>Title page,</u>
Item [76], the inventor's name should be -- Mark Ferrell. --

Signed and Sealed this

Eighteenth Day of May, 2004

JON W. DUDAS
*Acting Director of the United States Patent and Trademark Office*